April 12, 1966     B. AGRUSS     3,245,836

REGENERATIVE BATTERY

Filed Feb. 23, 1960

INVENTOR.
Bernard Agruss
BY
G. N. Shampo
ATTORNEY

United States Patent Office 3,245,836
Patented Apr. 12, 1966

3,245,836
REGENERATIVE BATTERY
Bernard Agruss, Indianapolis, Ind., assignor to General Motors Corporation, Detroit, Mich., a corporation of Delaware
Filed Feb. 23, 1960, Ser. No. 10,380
11 Claims. (Cl. 136—83)

This invention relates to electrochemical cells and more particularly to a galvanic cell of the regenerative type in which electrical current is generated by the oxidation of a cell reactant and regeneration is effected by separation of products formed during discharge of the cell.

Electrochemical cells have previously been used as a source of power for space flight vehicles but heretofore these cells were primary, non-rechargeable, batteries. The amount of power which a primary battery can supply is inherently dependent upon the amount of energy stored therein. Thus total power output of such a battery is materially increased only by increasing the amount of reactants available. This, of course, involves adding weight and size to a battery. Although there has been some analysis made on power systems employing secondary batteries for use in space flight vehicles, no such systems have been used. Both the primary and secondary batteries heretofore known have the undesirable characteristic of exceedingly high weight if they are to be suitable for any long term power generation. Moreover, for applications requiring high power drains even for comparatively short durations, the weight of such batteries becomes especially prohibitive.

It is in this area that my invention is especially useful. My invention can be used as a long term electrochemical power source and can be subjected to comparatively high power drains without inherently involving the prohibitive weight considerations involved in all power systems which are currently available. My invention involves the use of a new concept in a galvanic cell of the type frequently referred to as a fuel cell. The fuel cell of my invention not only can sustain rather high current densities for extended durations without deleterious effects but will also provide a high power output for extremely small size and weight.

A specific object of my invention is to provide a regenerative fuel cell system in which cell reactants are regenerated by thermally separating the product of the cell reaction.

Another object of my invention is to provide a power source involving a cell having molten metal electrodes and a fused salt electrolyte. A still further object of my invention is to provide a new and useful method of converting heat energy into electrical energy.

Other objects, features and advantages of my invention will become more apparent from the following description of specific embodiments thereof and from the drawing, in which.

Figure 1:
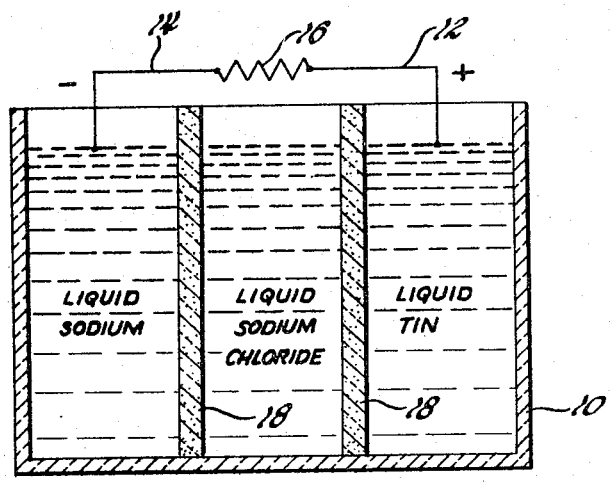
FIGURE 1 is a diagrammatic view showing a galvanic cell of the type encompassed by my invention.

The basic concepts of my invention can more clearly be explained in connection with the drawing and for this purpose reference is made to FIGURE 1. In FIGURE 1 there is diagrammatically shown a galvanic cell having a molten tin positive electrode, a molten sodium negative electrode and molten sodium chloride providing ionic conduction therebetween. By "positive electrode," I refer to that electrode which is positive in the external sense, that is positive for the purpose of attaching electrical leads to the cell. Similarly, the negative electrode referred to herein is that electrode which is negative in the external sense.

The electrodes and molten salt are contained in a nonconductive container 10, such as ceramic, which will withstand the temperatures inherently involved in operation of the cell. Conductors 12 and 14, respectively, attached to the positive electrode and the negative electrode form electrical leads to an external load 16. The liquids in the cell are contained in separate compartments formed by the porous separators 18. The separators can be formed of any suitable porous material, such as porous alundum, porous magnesium oxide, porous ceramics, porous brick and the like.

The cell shown in FIGURE 1 involves the following overall electrode reactions:

Negative electrode: Na (free)→Na$^+$+1 electron
Positive electrode: Na$^+$+1 electron→Na (associated with Sn)
Total cell: Na (free)→Na (associated with SN)

As indicated above the metal of the negative electrode is oxidized and thereby dissolved into the electrolyte as a positive ion. Concurrently, the positive ion of the electrolyte is reduced to the free metal at the positive electrode whereupon it associates with the metal of the positive electrode. It is the tendency for this latter association to occur that provides the driving force for the reaction.

In general my invention comprehends an electrochemical cell having a positive electrode and a negative electrode both formed of a molten metal. Various metals can be used as a positive electrode or a negative electrode in a galvanic cell made in accordance with my invention. However, certain basic characteristics of the metal combinations are required. The metal of each electrode in any given combination, of course, must both be molten at the same temperatures. Preferably the metals should have temperature ranges within which they are molten that are coextensive for several hundred degrees Fahrenheit. Moreover, the metals involved should not be completely immiscible and not be inert toward one another. As a practical consideration it is preferred that the molten metals be readily associable with one another to attain highest cell power. This association, of course, is of a chemical nature as opposed to a physical association.

In addition to forming an electrode with a single metal, it is also contemplated that an electrode can be formed of a plurality of particular metals. For example, the above-described cell will produce power even with substantial amounts of sodium present in the molten tin electrode. Thus, a cell can originally be formed having a positive electrode made of a mixture of sodium and tin, if one desires. Although in this instance potentials of the cell are lower than when the positive electrode is pure tin, certain metal combinations may provide higher cell potentials when using a mixture of metals as a molten metal electrode. A cell can be formed with a mixture of metals as each electrode. Unless expressly limited in particular context term, metal is used herein in its broadest sense, that is, it refers to a class of elements, including mixtures thereof, rather than to any single element in the class.

Not only can such a cell be formed with a mixture of particular metals at both the cathode and anode but the metal at each can be of the same mixture. In this latter instance a galvanic cell can be formed using different proportions of the same metal mixture as the respective positive and negative electrodes. A specific example of this latter type cell would be one in which a mixture of 1% sodium and 99% tin would be used as a positive molten metal electrode and a mixture containing 90% sodium and 10% tin would be used as a negative electrode.

Generally, the greater the difference in proportions of the metal mixtures, the greater the power output of the cell.

The particular type of association which is involved in the interaction between the positive electrode metal and the negative electrode metal is not material to operability. It is material, however, that some form of interaction exist such as alloying, forming intermetallic compounds, etc. It is preferred that the negative electrode metal have a high rate of diffusion into the metal of the positive electrode. This would reduce any problem of concentration polarization and may eliminate any need for mechanical agitation of the positive electrode metal.

In addition to tin and sodium, other examples of metal combinations which can be used in forming a fuel cell include sodium-lead, sodium-mercury, potassium-mercury, lithium-mercury, lithium-indium and lithium-gallium. As a general proposition I prefer to employ metals such as lead, tin, mercury, bismuth, cadmium, gallium, antimony and alloys of these metals as positive electrode metals. Among the negative electrode metals that are similarly preferred are sodium, potassium, rubidium, lithium, calcium, magnesium and active alloys of these metals. By "active," I mean that the resulting alloy has some tendency toward interaction with the positive electrode metal that can be utilized in my cell.

The electrolyte which is to be used in accordance with my invention preferably includes a salt containing the active metal of the negative electrode. The active metal is that metal which is oxidized during discharge of the cell. Although the salt may be used alone as the electrolyte, mixtures of this salt with other salts not containing the active metal can be used. If two active metals are present in the cell it will generally be advantageous to employ salt containing each of these metals in the electrolyte. In some instances, however, it may be preferred to employ an electrolyte containing another metal. In such instance I prefer that the electrolyte contain a comparatively high electropositive metal.

The salt, of course, for a thermal battery must be molten at a temperature at which electrodes are molten. Although especially high power output can be obtained when my invention is used in conjunction with a fused salt electrolyte, the basic concepts of my invention may also be used in making a battery having a water base electrolyte solution.

The temperature at which my galvanic cell is operated is primarily dependent upon the particular electrode metals used. Of a secondary consideration in a thermal fuel cell is the temperature at which the most suitable salt is molten and the affect of temperature on the characteristics of a cell. Generally it is desirable to use as high a temperature as is feasible to obtain optimum results but in some instances better results may be obtainable using the lowest feasible temperature. A tin-sodium-sodium chloride cell, for example, can be operated at a temperature of about 820° C.

Figure 2:
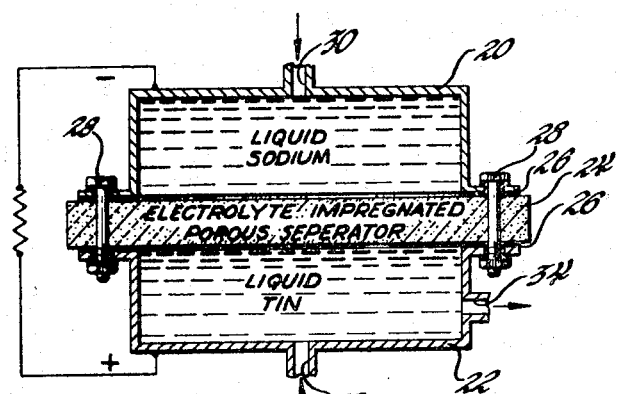
FIGURE 2 is a view schematically showing a particular type of cell construction which can be used in accordance with my invention.

As previously indicated, one of the most important features of my invention is to provide a galvanic cell which can be regenerated. The immediately following discussion will serve as a specific example of this modification of the invention. As shown in FIGURE 2, an exceedingly thin battery shell can be formed using two flanged cup-shaped members 20 and 22 which are spaced from one another by a porous separator 24. Liquid sodium in the upper member 20 forms a negative electrode while liquid tin in the lower member 22 forms a positive electrode. The liquid electrodes are separated by a porous non-conductive material which is impregnated with sodium chloride. The porous separator 24, as previously described, can be made of any suitable material which has the necessary porosity, inertness to the cell materials and high temperature stability which are required. Porous alundum, for example, can be used. The sodium chloride with which the separator is impregnated, of course, is molten at the operating temperature of the battery.

The flanged cup-shaped members 20 and 22 which are used to form the battery shell are preferably composed of a metal, such as stainless steel. However, any metal which is a good conductor and which is resistant to chemical attack by the cell materials can be used. It is desirable to provide nonconductive insulating seals 26 interjacent the porous separator and the flange of the battery housing. The entire assembly is secured by the insulated bolts 28. In such an arrangement, the terminal leads from the battery can directly be attached to the stainless steel shell for conveying electrical current to an external load.

The battery made in accordance with that shown in FIGURE 2 can not only provide electrical current at exceedingly high current densities but is also useful for the continuous generation of electrical current for exceedingly long durations. As previously indicated the cell reaction involves oxidizing sodium metal at the negative electrode and reducing sodium ions at the positive electrode. Thus, in effect, sodium metal is continuously being lost from the negative electrode and accumulating at the positive electrode, intermixed with the tin.

The potential for the cell reaction varies inversely with increasing amounts of sodium in the tin. Accordingly, not only does operation of the cell involve consuming the negative electrode but in so doing cell potential is gradually decreased. Accordingly, for long duration operation it is preferred to add sodium to the negative electrode and add tin to the positive electrode displacing equivalent quantities of impure (sodium-containing) tin. To permit a continuous addition of sodium to the negative electrode in FIGURE 2, an aperture 30 is provided in the upper battery shell member 20. A conduit from a source of molten sodium (not shown) can be attached to the aperture to supply the cell with sodium. The lower battery shell member 22 is also provided with an aperture 32 through which molten tin can similarly be introduced into the cell from a source of supply (not shown). A second aperture 34 in the lower battery shell member 22 is provided as an outlet for sodium-containing tin which is displaced by the incoming tin.

As tin and sodium are thermally separable, pure sodium and pure tin can be regenerated from the displaced impure tin merely by applying heat thereto. The sodium and tin so obtained can be recirculated, respectively, back to the negative and positive electrodes. In this manner the regenerating means serves as a source for the electrode materials. A flow diagram illustrating such an arrangement is shown in FIGURE 3.

Figure 3:
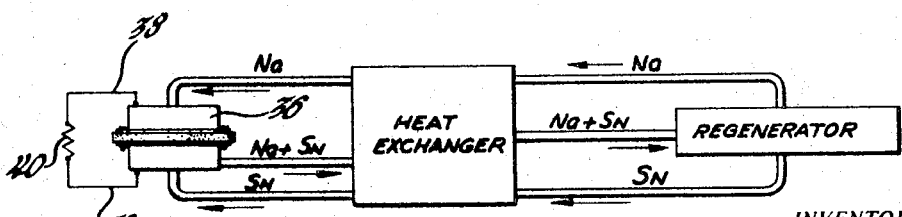
FIGURE 3 is a schematic flow diagram of a power system which includes means for regenerating cell reactants.

Referring now to FIGURE 3, there is shown a flow diagram involving a galvanic cell 36 of the type described in connection with FIGURE 2. The cell has an electrical lead 38 attached to each of the battery shell members and the leads, in turn, are connected to an external load 40. A conduit leading from the impure tin outlet preferably conveys the impure tin (Sn+Na) through a counterflow heat exchanger and then to a regenerator where the tin and sodium are thermally separated.

After separation the pure tin and pure sodium are conveyed via their respective conduits through the heat exchanger back to the respective electrodes. The conduits preferably pass through a heat exchanger to recover the heat of vaporization of the active metal sodium and the sensible heat of the base metal tin. Suitable pumps (not shown) are associated with the regenerator to induce the necessary flow of metal to and from the cell.

Also associated with the regenerating means is a source of heat (not shown). The specific source of the heat energy used is not material to the operability of this modification of my invention but may be important under certain conditions. For example, where weight considerations are a factor it may be desirable to use solar heat while under other conditions heat from a nuclear reaction or heat from organic fuels may be preferred.

The regenerator, of course, involves means coacting with the heat source to separate the liquid sodium from the liquid tin. The particular means which is employed forms no part of this invention and any suitable means for separating the two liquids can be used. Various techniques for separating two liquids having different vapor pressures can be used. For example, liquid sodium can be distilled from a sodium-tin mixture. A continuous process can be conducted using a fractionating column to continuously collect separated tin and sodium from a continuously introduced mixture.

When contemplating continuous operation of such a galvanic cell for periods exceeding one or two years even slight inefficiencies in the separation of the metals may become so appreciable as to eventually cause failure of the cell. In such instances it is especially desirable that the metal separation be as complete as is feasible. A more complete separation can be obtained, for example, if a rectifying column is used.

Although my invention has been described in connection with certain specific examples thereof, the discussion and examples are only offered for purposes of explaining the invention. No limitation is intended thereby and other ramifications of my invention not specifically referred to herein may occur to those skilled in the art. For example, in terrestrial applications a porous diaphragm may not be necessary in a galvanic cell of my invention. The various liquids present may be floated on one another because of density differences obviating the need for a porous separator.

I claim:

1. A power source comprising a fuel cell having a positive electrode of a molten metal selected from the group consisting of lead, tin, mercury, bismuth, cadmium, gallium and antimony, a negative electrode of a molten metal selected from the group consisting of sodium, potassium, rubidium, lithium, calcium and magnesium and a molten salt electrolyte providing ionic conduction therebetween, said salt having a positive ion of the active negative electrode metal, said positive electrode metal being chemically interactive with said negative electrode metal to form a thermally separable combination therewith, said negative electrode metal being oxidizable by the reduction and combination of negative electrode metal ions with said positive electrode metal, means for continuously thermally separating metal for said negative electrode from said positive electrode molten metal, a heat exchanger, means for continuously conveying molten metal from the positive electrode of said cell through said heat exchanger to said separating means, means for continuously conveying negative electrode metal from said separating means through said heat exchanger to the negative electrode of said cell and means for continuously conveying separated positive electrode molten metal from said separating means through said heat exchanger to the positive electrode of said cell.

2. The method of electrochemically generating electrical current comprising the steps of discharging a galvanic cell having a positive electrode of a molten metal selected from the group consisting of lead, tin, mercury, bismuth, cadium, gallium and antimony, a negative electrode of an active metal selected from the group consisting of sodium, potassium, rubidium, lithium, calcium and magnesium and a molten salt electrolyte providing ionic conduction therebetween, said salt containing a positive ion of the active negative electrode metal, said positive electrode metal being chemically interactive with said negative electrode metal to form a thermally separable combination therewith, said active negative electrode metal being oxidizable by the reduction and combination of active metal ion with said positive electrode metal, removing quantities of molten metal from the positive electrode of said cell, thermally separating active negative electrode metal from said quantity of molten metal, conveying said separated active metal to said negative electrode and conveying separated positive electrode metal to said positive electrode.

3. In a power source, a fuel cell, a molten metal positive electrode containing one or more elemental metals selected from the group consisting of lead, tin, mercury, bismuth, cadmium, gallium and antimony, a molten metal negative electrode containing one or more active metals selected from the group consisting of sodium, potassium, rubidium, lithium, calcium and magnesium and an electrolyte providing ion communication between said electrodes, said electrolyte containing a positive ion of said active negative electrode metal and being a liquid at a temperature in common with said positive and negative electrode metals.

4. A fuel cell as recited in claim 3 in which tin is a positive electrode metal and sodium is an active negative electrode metal.

5. A fuel cell as recited in claim 3 in which mercury is a positive electrode metal and sodium is an active negative electrode metal.

6. A fuel cell as recited in claim 3 in which mercury is a positive electrode metal and potassium is an active negative electrode metal.

7. A fuel cell as recited in claim 3 in which indium is a positive electrode metal and lithium is an active negative electrode metal.

8. A fuel cell as recited in claim 3 in which gallium is a positive electrode metal and lithium is an active negative electrode metal.

9. In a fuel cell, a molten metal positive electrode containing at least one elemental metal selected from the group consisting of lead, tin, mercury, bismuth, cadmium, gallium and antimony and at least one active metal selected from the group consisting of sodium, potassium, rubidium, lithium, calcium and magnesium, a molten metal negative electrode containing the same molten metal combination used in said positive electrode, the proportion of said second-mentioned group of metals being higher in said negative electrode than in said positive electrode and an electrolyte providing ion communication between said electrodes, said electrolyte containing a positive ion of at least one active negative electrode metal and being a liquid at a temperature in common with said positive and negative electrode metals.

10. The method of generating electrical power which comprises forming a fuel cell having a molten metal positive electrode containing at least one metal selected from the group consisting of lead, tin, mercury, bismuth, cadmium, gallium and antimony, a molten metal negative electrode having at least one active metal selected from the group consisting of sodium, potassium, rubidium, lithium, calcium and magnesium, and a liquid electrolyte providing ion communication between said electrodes, said electrolyte containing a positive ion of at least one active negative electrode metal and being a liquid at a temperature in common with said positive and negative electrode metals, and discharging said fuel cell by providing an electron connection between said electrodes.

11. The method of generating electrical power which comprises the steps of discharging a fuel cell having a molten metal positive electrode containing at least one elemental metal selected from the group consisting of lead, tin, mercury, bismuth, cadmium, gallium and antimony, a molten metal negative electrode having at least one active metal selected from the group consisting of sodium, potassium, rubidium, lithium, calcium and magnesium, and a liquid electrolyte providing ion communication between said electrodes, said electrolyte containing a positive ion of the active negative electrode metal and being a liquid at a temperature in common with said positive and negative electrode metals, removing a quantity of positive electrode metal from said cell for regeneration, separating active negative electrode metal from said quantity, conveying the separated active negative electrode metal to the negative electrode of said cell and reconveying the balance of said quantity to the positive electrode of said cell.

References Cited by the Examiner

UNITED STATES PATENTS

| | | | |
|---|---|---|---|
| 553,719 | 1/1896 | Olan | 136—120 |
| 1,535,458 | 4/1925 | Frary | 204—243 |
| 1,816,972 | 8/1931 | Jessup | 204—243 |
| 1,843,698 | 2/1932 | Ruben | 136—83.1 |
| 2,102,701 | 12/1937 | Gyuris | 136—83.1 |

OTHER REFERENCES

G. W. Vinal: Storage Batteries, 2nd ed., 1930, pp. 147 and 148.

Stein: Status Report on Fuel Cells, ARO Report No. 1, June 1959, page 23, U.S. Dept. of Comm., Office of Technical Services, PB151804.

JOHN H. MACK, *Primary Examiner.*

JOHN R. SPECK, *Examiner.*